Aug. 15, 1967  K. GERBER  3,335,669
FLUID PRESSURE MACHINE
Filed Dec. 22, 1966  6 Sheets-Sheet 1

Inventor
Karol Gerber
By Ja Hilton Jones
Attorney

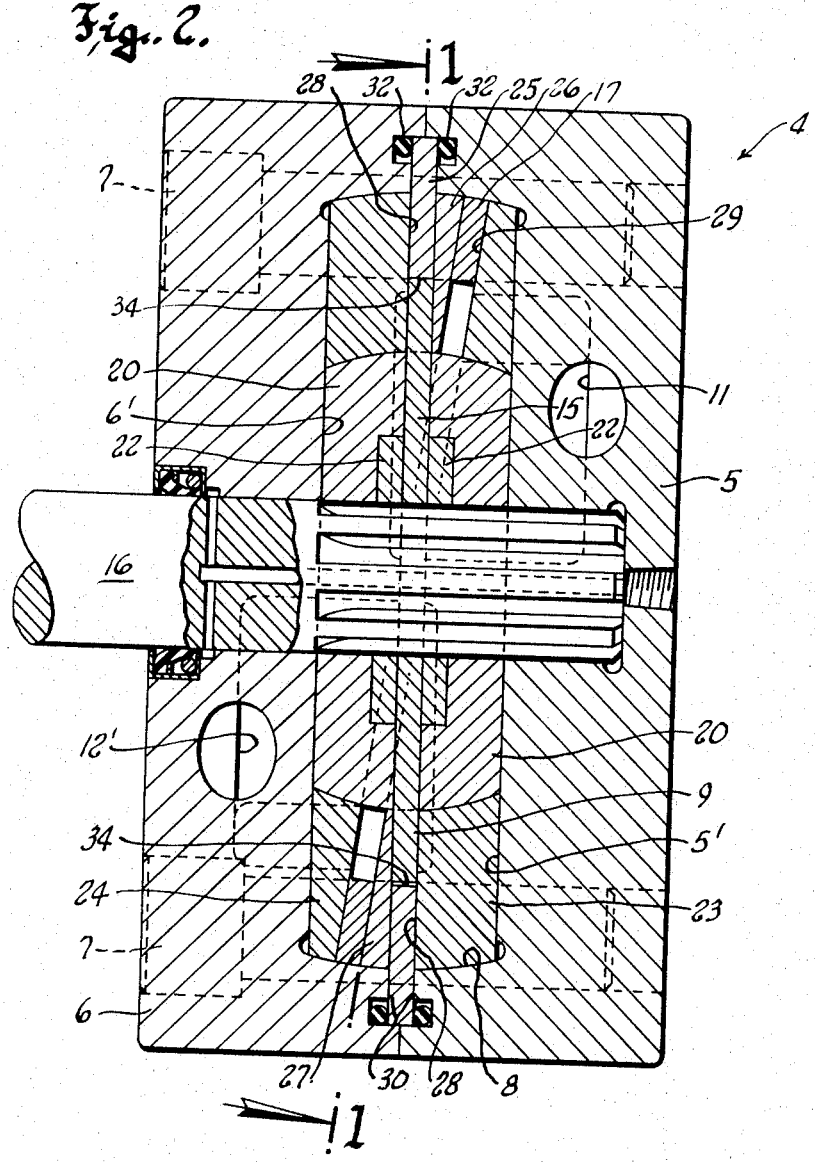

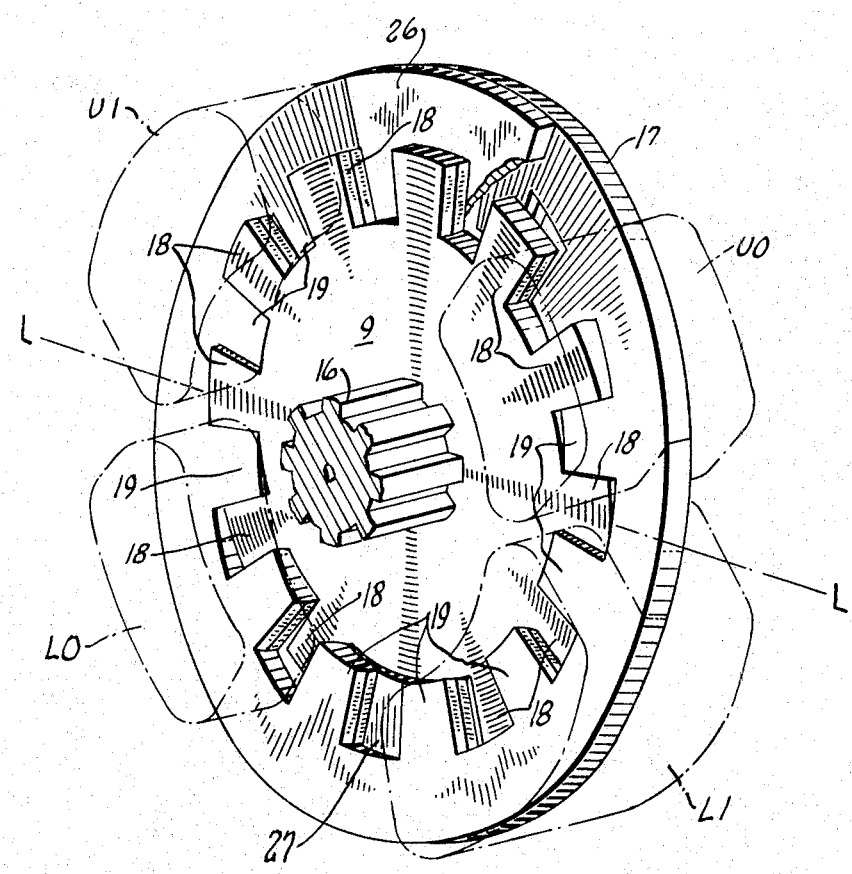

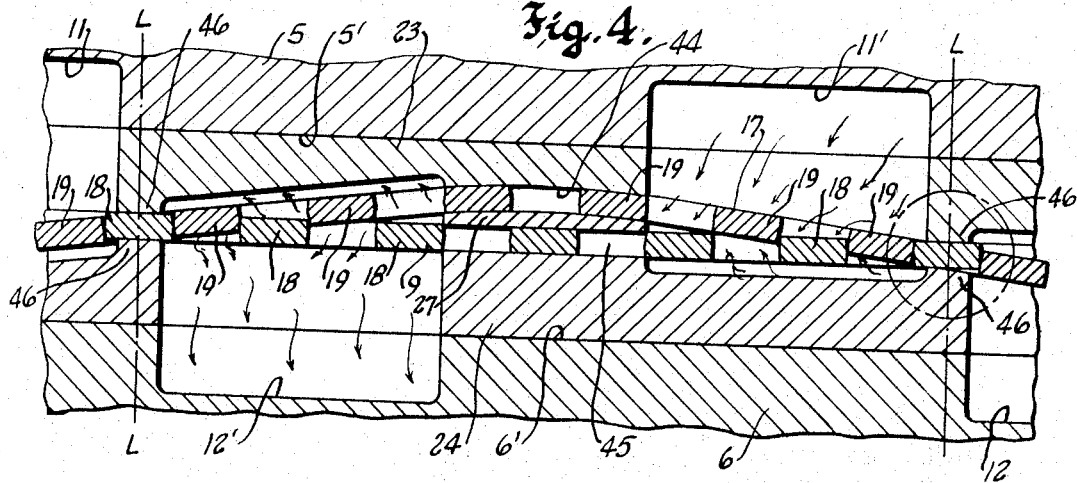
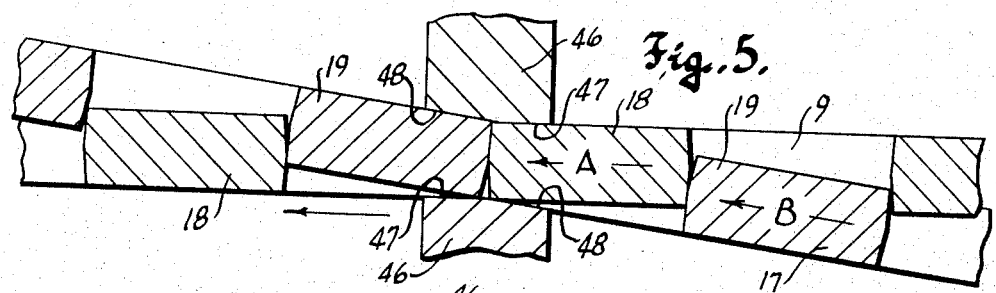
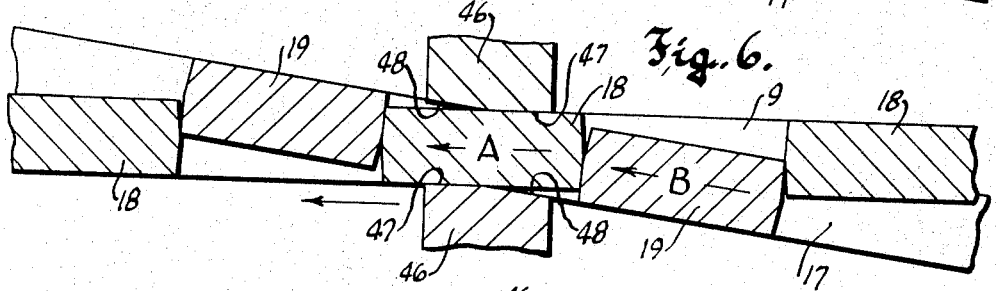
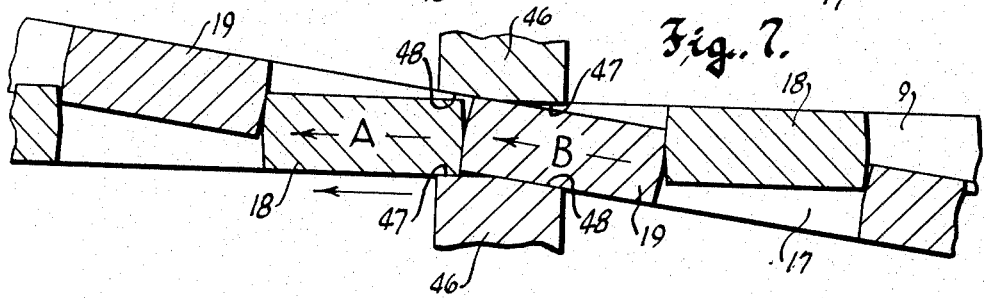

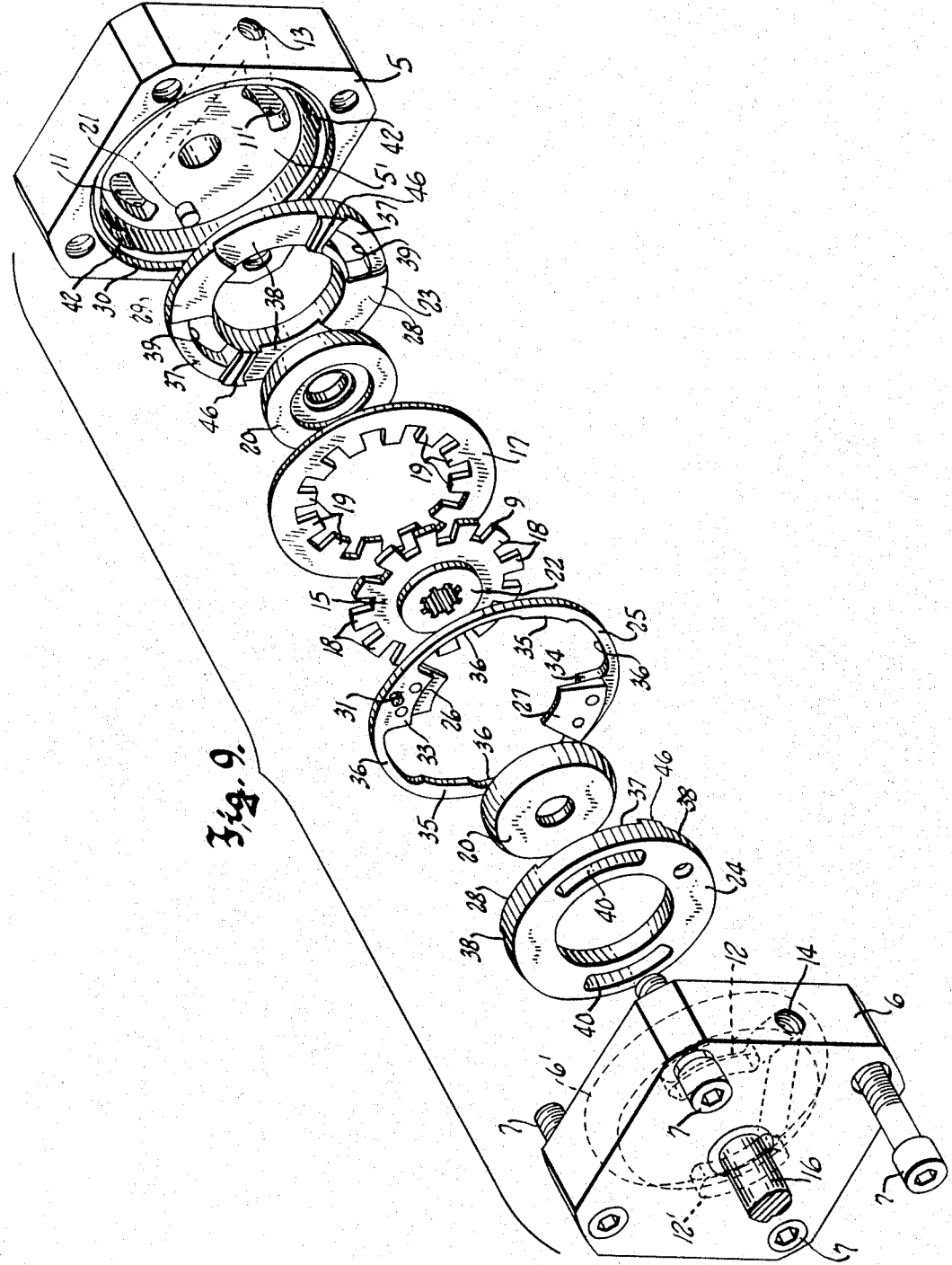

_United States Patent Office_ 3,335,669
Patented Aug. 15, 1967

3,335,669
FLUID PRESSURE MACHINE
Karol Gerber, Milwaukee, Wis., assignor to Koerper Engineering Associates, Inc., Milwaukee, Wis., a corporation of Wisconsin
Filed Dec. 22, 1966, Ser. No. 603,974
11 Claims. (Cl. 103—127)

This invention relates to rotary fluid pressure machines capable of use either as a pump or a motor.

The invention has as its purpose to provide a highly efficient rotary fluid pressure machine which, because of its novel design and mode of operation has no serious sealing problems, no unbalanced and vibrating working parts, and requires no expensive ball bearings.

More specifically, one of the objects of this invention is to provide a rotary fluid pressure machine in which the radial and axial forces from the pressurized fluid in the machine are at all times balanced around the axis of rotation. This obviates the need for highly loaded ball bearings.

Another object of this invention is to provide a machine of the character described in which the torque and the volumetric flow through the machine are constant, as distinguished from the pulsating flow and pulsating torque characteristics of some conventional rotary fluid pressure machines.

Another object of this invention is to provide a rotary fluid pressure machine wherein the forces developed are always substantially tangential to the rotor of the machine, so that the torque produced is direct rather than the resultant of forces applied in directions other than tangential.

Still another object of this invention is to provide a rotary fluid pressure machine which has no alignment problems such as those involved in the design and construction of gear pumps.

Finally, it is an object of this invention to provide a rotary fluid pressure machine which may be used either as a pump or a motor, which may rotate in either direction, which constitutes a substantial improvement over prior machines of this type, and which lends itself well to inexpensive mass production.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 2 is a longitudinal sectional view through the machine of this invention, taken essentially on the plane of the line 2—2 in FIGURE 1;

FIGURE 3 is a perspective view of the rotor element of the machine of this invention with the inlet and outlet chambers of the machine diagrammatically illustrated to show their positional relationship to the rotor element;

FIGURE 4 is a developed sectional view taken along the curved line 4—4 in FIGURE 1;

FIGURES 5, 6 and 7 are detail sectional views on an enlarged scale, of the portion of the structure encompassed within the broken line circle in FIGURE 4, and illustrating that portion of the structure in three successive stages or steps;

FIGURE 9 is an exploded perspective view of the structural components of the machine.

Figure 1:
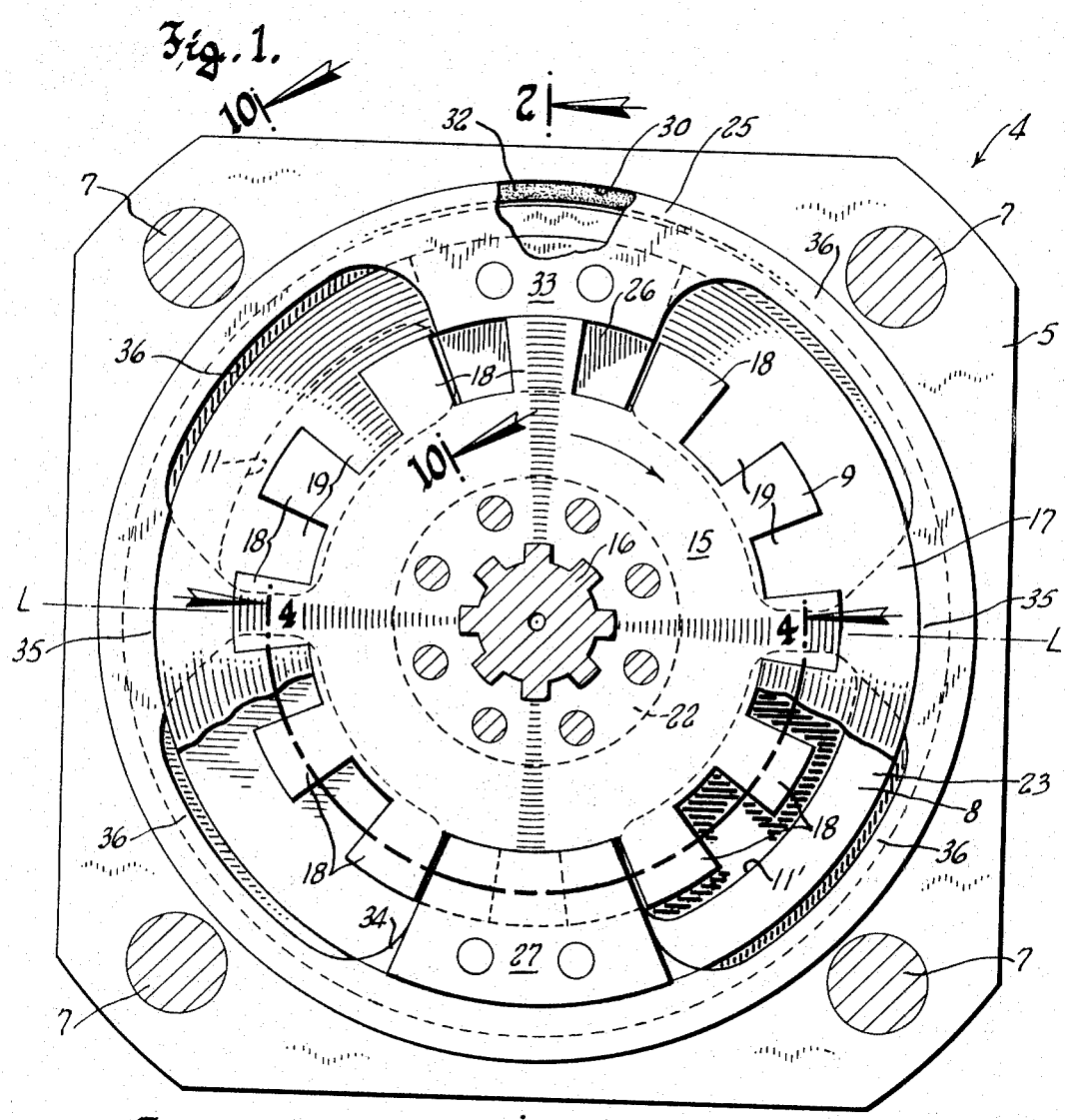
FIGURE 1 is a cross sectional view through a rotary fluid pressure machine embodying this invention, said view being taken essentially on the plane of the line 1—1 in FIGURE 2.

Referring now particularly to the accompanying drawings in which like numerals indicate like parts throughout the several views, the numeral 4 designates generally the housing of the fluid pressure machine of this invention. This housing consists of two complementary sections 5 and 6 which are secured together by cap screws 7, and together define a circular chamber 8 in which a rotor 9 is located. The rotor chamber 8 is formed by opposed shallow cup-shaped wells or cavities 5' and 6' in the inner mating faces of the two housing sections. In the bottom of each of these wells or cavities there are two diametrically opposite arcuate recesses, those in the housing section 5 being designated 11–11', and those in the housing section 6 being designated 12–12'. The recesses 11–11' are communicated through suitable passages with an inlet port 13, and the recesses 12–12' are communicated through suitable passages with an outlet port 14. FIGURE 9 affords the best illustration of this porting.

The rotor 9 comprises a disc 15 splined to the shaft 16 of the machine to rotate therewith in a plane normal to the shaft axis, and a ring 17 which encircles the disc but which rotates on an axis that is oblique to that of the shaft and intersects the shaft axis at the point where the latter passes through the median plane of the disc 15. This point can be considered the center of the rotor. The shaft is, of course, journalled in the housing for rotation on a fixed axis, but for this purpose the simplest bearing will suffice, so long as provision is made for lubricating the bearing and a suitable seal is provided where the shaft emerges from the housing section 6, as shown in FIGURE 2. If the machine is used as a pump, the shaft 16 is driven by a suitable prime mover (not shown), and if it operates as a motor, the shaft constitutes the power output of the machine.

The outer peripheral portion of the disc 15 is castellated to provide a circle of equispaced teeth 18, and the inner edge portion of the ring 17 is similarly castellated to form a circle of inwardly projecting teeth 19. The teeth 18 on the disc are of the same shape and substantially the same size as the gullets or spaces between the teeth 19 on the ring, and similarly the teeth 19 on the ring are of the same shape and substantially the same size as the gullets or spaces between the teeth 18. Also, the circular orbits of the teeth on the disc and on the ring are of the same diameter. The number of teeth is not important; but an odd number of teeth on both the disc and the ring has the advantage of assuring constant hydraulic and mechanical loading on both of the toothed members.

In view of the inclination of the axis of the ring with respect to the axis of the shaft and disc, the orbits of the teeth 18 and 19 lie in obliquely disposed plane. These planes intersect one another on an imaginary line which extends diametrically through the entire structure and passes through the center of the rotor, i.e. the point at which the axes of the shaft and ring intersect. This imaginary line is shown in dot and dash in FIGURES 3 and 4 where it is identified by the letters L—L, and for convenience in description, this line may be likened to the equator since it divides the entire structure, and especially the rotor, into upper and lower halves, or—loosely—into northern and southern hemispheres.

Obviously, since the orbits of the teeth 18 on the disc and the teeth 19 on the ring have the same diameter, the teeth must intermesh at the two diametrically opposite points where they cross the "equator" L—L. In fact, it is only by virtue of the intermeshing engagement of the teeth on the disc and ring that the obliquely disposed intersecting relationship of the disc and ring is possible. It also follows, of course, that because of this intermeshing engagement of the teeth, the ring and disc are constrained to rotate together, but each about its own axis.

An important observation to be made at this point is that the separate orbits of the teeth 18 on the disc and the teeth 19 on the ring have a common center, which is the center of the rotor where the axes of the shaft and disc intersect and through which the "equator" L—L passes; and that the included angle between the planes of the disc and ring is sufficient to have the teeth on the disc and ring entirely out of mesh and separated through a substantial part of their respective orbits at each side of the "equator."

The rotor disc 15 is held against axial displacement from the position in which its median plane contains the point of intersection between the axes of the shaft and the ring 17 by being confined between a pair of collars 20 which encircle the shaft and have a thickness, i.e. an axial dimension, sufficient to span the distance between the opposite sides of the disc and the bottoms of the cavities 5' and 6'.

For a purpose to be explained, the peripheral surfaces of the collars 20 are spherically curved, with the radius of that curvature the same for both collars and centered on the center point of the rotor. Moreover, the radius of the curved peripheral surfaces of the collars is the same as that of the bottoms of the gullets or spaces between the teeth 18 on the disc. Hence, only the teeth 18 project beyond the peripheral curved surfaces of the collars.

For functional reasons, the collars 20 could be integral parts of their respective housing sections, but for convenience in production they are preferably made as separate parts.

Another detail which bears mention at this point is that in order to adequately carry the torque load at the splined connection of the disc with the shaft, hub plates 22 which are also splined to the shaft, are preferably secured to the opposite sides of the disc.

The toothed ring 17 is rotatably confined to its inclined plane by a pair of stationary end rings 23 and 24 in coaction with a center ring 25 and a pair of diametrically opposite wedge-shaped members 26 and 27. The two wedge-shaped members are identical in size and shape, as are the two end rings, but the wedge-shaped members and end rings are respectively located diametrically opposite one another at opposite sides of the center ring. The end rings are seated in the cavities or wells 5' and 6' and held against turning therein, as by means of pins 21.

Each end ring has a flat back surface which, like the collars 20, seats upon the bottoms of the cavities or wells 5', 6'. The front face of each end ring has terminal surfaces 28 and 29 which lie in two angularly disposed planes, the surface 28 being in a plane normal to the shaft axis and the surface 29 being in a plane normal to the axis about which the ring 17 turns. In fact, it is the angle between the planes of the terminal surfaces 28 and 29 which determines the angular position of the toothed ring 17 with respect to the disc 15.

Since the terminal surface 28 of each end ring is normal to the shaft axis, it is of course parallel to the back face of the end ring, and the distance between it and the back faces corresponds to the axial thickness of the collars 20. The surfaces 28 are thus flush with the surfaces of the collars that bear against the disc, so that the teeth 18 on the disc have snug surface-to-surface sliding engagement with the surfaces 28. The surfaces 28 on the end rings thus cooperate with the teeth 18 on the disc to define radially outwardly opening pockets between the teeth, except where said surfaces are interrupted, as they are in a manner and for a purpose to be later described.

As shown in FIGURE 2, the two end rings are so disposed with respect to one another that their inclined surfaces 29 are parallel, with one of them above the "equator" and the other below the "equator." Accordingly, the inclined surfaces of the two end rings have surface-to-surface engagement with the opposite sides of the toothed ring 17, each throughout 180° of the orbit of the teeth on said ring, except where the surfaces 29 are cut away or relieved, as will be described. Thus, one face of the toothed ring 17 rides against the inclined surface 29 of one of the end rings, while the other face of the ring rides on the inclined surface 29 of the other end ring.

Both the inner and outer circumferential surfaces of the end rings are spherically curved about the center point of the rotor, and the radial thickness of the rings is such that each fills the space between the spherically curved surfaces of its adjacent collar 20 and the side wall of the cavity or well 5'–6', in which it is received, said cavity side wall having a spherical curvature corresponding to that of the outer circumferential surface of the end ring to snugly fit the same.

The toothed ring 17 is held against the diametrically opposite parallel inclined surfaces 29 of the two end rings by the wedge-shaped members 26–27, which are secured to the opposite sides of the center ring 25 diametrically oposite one another. One side of each wedge-shaped member has flat surface-to-surface engagement with the center ring; the other side thereof is shaped to have surface-to-surface engagement with the adjacent side of the toothed ring; and radially the wedge-shaped members extend across the space between the spherically curved sides of the wells 5'–6' and the spherically curved peripheries of the collars 20. For reasons explained hereinafter, the width of the wdge-shaped members, that is, the circumferential distance between their converging side edges, is substantially equivalent to three times the width of a tooth.

Functionally, the wedge-shaped members 26–27 could be integral with the center ring 25, but for production expediency they may be formed as separate pieces and then riveted to the center ring.

The center ring 25 has an outside diameter somewhat greater than that of the mouths of the cavities or wells 5'–6'. The ring 25 is clamped between the inner faces of the housing sections, which are counterbored as at 30 to acommodate the peripheral portion of the ring. The thickness of the ring 25 is substantially the same as that of the rotor disc 15, and since the mating faces of the housing sections lie on the median plane of the rotor disc, the depth of each counterbore 30 is half the thickness of the ring 25.

Suitable locating means cooperate with the housing sections and the ring 25 to secure the latter against rotation and assures that the ring will be in its proper orientation in the housing, with the wedge-shaped members 26–27 on the ring symmetrical to an axis that is perpendicular to the "equator" L—L. Such locating means can comprise a pin 31 projecting from at least one side of the ring into an appropriately located hole in the inner face of the adjacent housing section.

The housing is sealed against leakage by means of O-rings 32 received in grooves in the mating faces of the housing sections and engaging opposite sides of the peripheral portion of the center ring 25.

The radius of the inner edge of the center ring 25 differs at various places around its circumference. The smallest radius portions of the inner edge of the center ring form the inner edges of diametrically opposite segments 33 and 34 to which the wedge-shaped members 26 and 27 are respectively secured, and the inside radius of these edge portions is substantially equal to the outside radius of the rotor disc 15, as best seen in FIGURE 2. The next smallest inside radius portions of the center ring define the inner edge of two diametrically opposite segments 35 which are equispaced from the segments 33–34 and which are thus bisected by the "equator" L—L. The radius of these segments 35 is substantially equal to the outside radius of the toothed ring 17.

Figure 10:
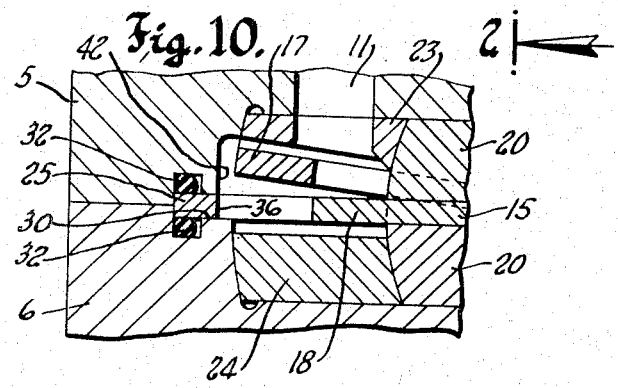
FIGURE 10 is a detail sectional view through FIGURE 1 on the plane of the line 10—10.

Between the segments 33–34 and the segments 35 are four segments 36 at which the inside edge of the ring has its greatest radius, the radius of the inner edge of these four segments being somewhat larger than the outside radius of the toothed ring 17, as best seen in FIGURES 1 and 10. The four segments 36 of the center ring lie adjacent to segments of the end rings 23 and 24 at which the adjacent faces of the end rings are relieved or cut back to provide two pairs of circumferentially spaced and alternately arranged arcuate recesses 37 and 38. The end ring 23 has arcuate holes 39 therethrough opening to the bottoms of its recesses 37 and registering with the recesses 11 and 11' in the housing section 5; and the end ring 24 has arcuate holes 40 therethrough which similarly open to the bottoms of its recesses 37 and register with the recesses 12 and 12' in the housing section 6. The bottoms of the recesses 38 in both end rings are imperforate. The recesses 37 in one end ring are axially opposite the recesses 38 in the other end ring, and vice versa.

As shown in FIGURES 9 and 10, the side wall of the cavities or wells 5'–6' are somewhat relieved as at 42 adjacent to the recesses 11–11' and 12–12' to provide communication between axially opposite recesses 37 and 38 around the outer edge of the toothed ring 17.

It will be seen that four circumferentially spaced chambers are formed by the recesses 37 and 38 in the end rings in cooperation with the spherically curved sides of the cavities 5'–6', the spherically curved peripheral surfaces of the collars 20 and the relieved portions 42 in the cavities. Two of these chambers are communicated with the inlet port 13 and can therefore be designated inlet chambers; the other two are communicated with the outlet port 14 and can be designated outlet chambers. Note that each inlet chamber is paired with an outlet chamber at its side of the "equator" L—L, and that each chamber has its diametrically opposite counterpart at the other side of the "equator."

Figure 8:
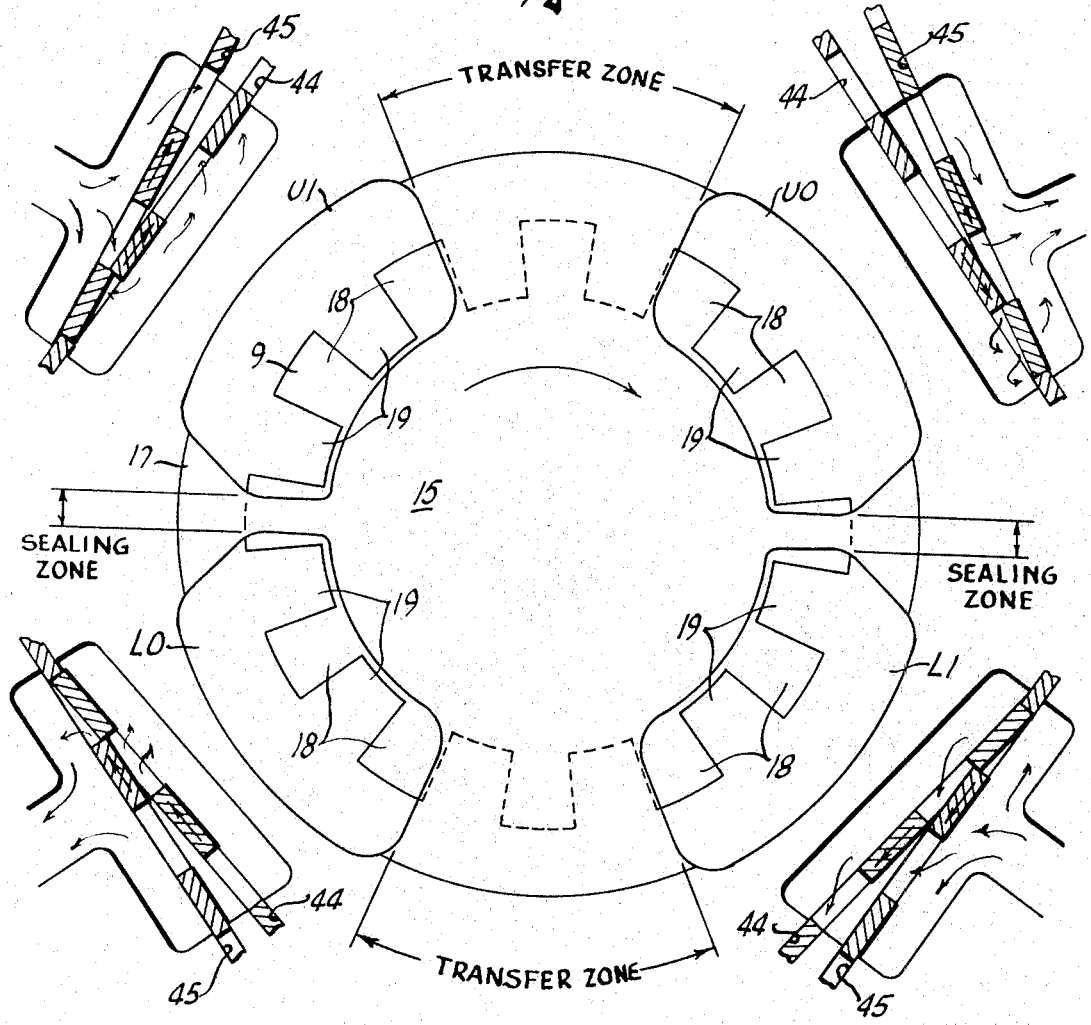
FIGURE 8 is a more or less diagrammatic view to illustrate the manner in which the machine of this invention functions.

The inlet and outlet chambers are diagrammatically illustrated in FIGURES 3 and 8 where the inlet and outlet chambers that lie above the "equator" are designated UI and UO, while the chambers below the "equator" are designated LI and LO.

Each inlet chamber is connected with its paired outlet chamber by means of a pair of passages 44 and 45 that closely fit the toothed rotor elements and through which fluid is carried by the spaces between the teeth of the rotor elements from the inlet chamber to the outlet chamber. Specifically, the passage 44 which is occupied by the toothed inner edge portion of the ring 17 is defined by the oblique terminal surface 29 on the end ring, in cooperation with its opposing surface on the wedge-shaped member 26–27 and the hemispherical surface on the collar 20. The other passage 45, which is occupied by the toothed peripheral portion of the rotor disc 15, is defined by the terminal surface 28 on the end ring that is normal to the rotor shaft, in cooperation with its opposing surface on the wedge-shaped member 26–27 and the adjacent segment 33–34 of the center ring 25.

As mentioned above, the width of the wedge-shaped members 26–27, measured circumferentially, being three times the width of a tooth, is sufficiently great that there always one tooth of the ring 17 in the passage 44 and one tooth of the disc 15 in the passage 45, so that at no time can fluid flow from an inlet chamber unrestrictedly through either passage 44 or 45 to its paired outlet chamber. Instead, the toothed peripheral portion of the disc 15 and the toothed inner circumferential portion of the ring 17 provide, in effect, moving chambers or pockets in which fluid is carried through the respective passages 44–45, such moving chambers being of course defined by the gullets or spaces between the teeth on the rotor members as the teeth move in their orbits.

On and near the "equator" line L—L at which the disc 15 and ring 17 are in meshingly intersecting relationship they and their intermeshed teeth cooperate with circumferentially narrow equatorial segments 46 on the end rings to seal each chamber from the chamber adjacent to it at the other side of the "equator," that is, to effectively prevent all fluid flow across the "equator."

Each of the segments 46 has two surface portions 47 and 48. One surface portion, designated by 47, lies in a plane perpendicular to the axis of the rotor shaft 16, and is engaged by the teeth on the disc 15. The other face 48 is oblique to the first and at the same angle thereto at which the ring 17 is inclined to the disc 15. The surfaces 47 on the two end rings are spaced apart by a distance equal to the thickness of the disc, and the surfaces 48 are similarly spaced apart by a distance equal to the thickness of the ring 17. The junction between the two surfaces 47 and 48 of course lies along the "equator."

FIGURES 5–7 illustrate how the teeth on the disc 15 and ring 17 cooperate with surfaces 47 and 48 on end ring segments 46 as those teeth cross the "equator" in meshing relationship. Beginning with FIGURE 5, the orbital progress of a tooth A on the disc 15 can be traced through FIGURES 6 and 7, from the point (FIGURE 5) where it cooperates with its preceding tooth on ring 17 to provide a seal between opposing segments 46, through the point (FIGURE 6) where the tooth A alone effects the seal between those segments, to the point (FIGURE 7) where its succeeding tooth B on the ring 17 provides the seal.

Preferably the leading and trailing edge surfaces of the teeth are very slightly beveled or V-shaped in profile, along their lengths, as illustrated in FIGURES 5–7, to provide for smooth, close meshing despite the oblique relationship of the rotor members; but sealing between the teeth is not necessary for proper functioning of the machine. The hydraulic force by which rotation is produced results from the hydraulic pressure on the ends of the teeth, as will be shown.

Having in mind the above explanation of the construction of the machine of this invention, its operation will now be described, with particular reference to FIGURES 4–8. Considering it first as a pump, wherein the shaft 16 of the rotor is driven by a suitable prime mover, the ring 17 is constrained to rotate at the same speed as the disc by reason of the meshing relationship between the ring and disc at the "equatorial" zones in which the orbits of their teeth intersect. As the intermeshing teeth move through those zones, they successively coact with the segments 46 to continually provide a seal between the chambers at opposite sides of the "equator" which prevents transfer of fluid from one such chamber to the other.

As the teeth on the rotor members move orbitally away from the "equator," out of the sealing zones, they enter the two diametrically opposite inlet chambers and simultaneously their orbits begin to diverge owing to the oblique disposition of the rotor members. Such divergence of their orbits carries the respective teeth on the disc and ring flatwise apart and in effect opens the pockets defined by the gullets between them. About halfway through the inlet chambers the teeth on the two rotor members are completely disengaged from one another, so that the pockets are fully opened and therefore completely filled with fluid. The progress of the teeth through the inlet chambers is illustrated in the upper left-hand and the lower right-hand quadrants of FIGURE 8 and in the right-hand portion of FIGURE 4.

From the inlet chambers the teeth on the rotor members move through their respective passages 44 and 45, wherein the passage-defining portions of the stationary structure (described hereinbefore) cooperate with the orbitally moving teeth to close and substantially seal the pockets or moving chambers between teeth, so that a charge of fluid is carried in each pocket from each inlet chamber to its paired outlet chamber. Since there is always at least one tooth in each of the passages 44 and 45, no reverse flow of fluid can take place. Furthermore, because the adjacent ends of the passages 44 and 45 are in a plane lying on and radial to the axis of shaft 16, and because of the meshing relationship of the rotor members, the teeth on the rotor members emerge from the passages 44 and 45 in a regularly alternating sequence, which is to say that there is always a pocket of one rotor member or the other that is moving into an outlet chamber, so that the flow of fluid from the inlet chambers to the outlet chambers is steady and continuous rather than varying or pulsating, and since the fluid thus brought into the outlet chambers cannot leave the same at the sealed "equator," it will be forced from the outlet chambers through the port 14 at a pressure depending upon the load being driven. This relationship can be readily seen in FIGURE 4.

The point of maximum divergence of the orbits of the teeth on the rotor members is midway through the passages 44 and 45, at a line perpendicular to the "equator" L—L and to the axis of the rotor shaft. From that point the tooth orbits again converge as the teeth progress orbitally toward the "equator," and the teeth on the rotor elements move relatively flatwise back into meshing relationship. In so doing, each tooth on one rotor member serves as a plug which progressively fills a gullet in the other rotor member to provide a continuous seal at the "equator" and, of course, in so doing it displaces the fluid from the gullet.

Because of the balanced arrangement on the two sides of the "equator" L—L, no radial or axial forces are imposed upon the rotor shaft and its bearing can be a simple and inexpensive one.

When the machine of this invention is operating as a motor, pressure fluid is introduced into the inlet chambers and return or exhaust fluid is expelled from the outlet chambers, with the result that there are high and low pressure zones at opposite sides of the "equator." While fluid flow across the "equator" from one of these zones to the other is again prevented by the meshed teeth of the ring and disc cooperating with the segments 46, fluid can flow through the passages 44 and 45 in a steady succession of increments provided the teeth therein move— and they will move and produce rotation of the rotor if the torque on the rotor due to the hydraulic forces acting thereon is greater in one direction than the other. This, of course, is the case as will now be shown.

Referring particularly to FIGURE 4, it will be seen that one tooth of the rotor (either on the ring or the disc) always has one face thereof in its respective passage, while its opposite face is in the high pressure inlet chamber. Hence, the high pressure fluid in the inlet chamber can act only on one of the two opposite faces of this tooth and, as a result, the forces acting tangentially on this tooth are not in balance. All other tooth surfaces—on the ring as well as the disc—that are in the inlet chamber are subjected to balanced fluid pressure produced forces.

At the low pressure outlet chamber the situation is the same, so that whatever pressure exists in the outlet chamber would oppose emergence of the teeth from their respective passages into the low pressure outlet chamber. However, since the pressure in the outlet chamber is much lower than in the inlet chamber, and since the areas of all of the tooth surfaces against which tangential forces can be exerted are the same, it follows that the net effect of the hydraulic forces acting on the rotor produces torque in the direction to move the rotor teeth through the passages 44 and 45 from the inlet chamber towards the outlet chamber. This situation, of course, obtains on both sides of the "equator" so that no radial or axial forces will be imposed upon the shaft, and owing to the intermeshing relationship of the rotor members, flow of fluid through the machine will be continuous and steady and the output torque will be correspondingly smooth and uniform.

It will be apparent that the direction of pumping with the machine of this invention can be reversed by mere reversal of the direction of shaft rotation, whereby the chambers which are nominally the inlet chambers become the outlet chambers, and vice versa. The direction of rotation of the machine as a motor can be similarly reversed by mere transposition of the pressure and return fluid connections to the nominal inlet port 13 and the nominal outlet port 14. Such ready reversability is of course due to the balanced and symmetrical arrangement of the machine.

From the foregoing description together with the accompanying drawings it will be apparent that this invention provides a reversible fluid machine that is operable either as a pump or a motor, and which features a steady, continuous non-pulsating flow of fluid through the machine and a symmetrical arrangement such that no axial or radial forces are imposed upon the rotor shaft of the machine.

What is claimed as my invention is:

1. A rotary fluid pressure machine alternatively capable of operating as a pump and as a motor, depending upon whether the machine is driven or is supplied with fluid under pressure, said machine comprising:
   (A) a gear-like rotor member having on its peripheral portion radially outwardly projecting teeth which are circumferentially spaced apart to define gullets between them;
   (B) a ring member having on its inner circumferential portion radially inwardly projecting teeth which are closely receivable in said gullets in the rotor member and which are circumferentially spaced apart to define gullets in which the teeth on the rotor member are closely receivable;
   (C) a housing in which the rotor member is journalled for rotation on a fixed axis so that its teeth move in a defined circular orbit;
   (D) fixed guide means in the housing constraining the ring member to rotation about a fixed axis which is obliquely inclined to and intersects that of the rotor member and by which the ring member is so disposed that its teeth move in a predetermined orbit and intermeshingly cross the orbit of the rotor member teeth at a pair of points spaced from one another along said respective orbits, meshing interengagement of the teeth of said members at said points drivingly connecting the ring member and the rotor member;
   (E) fixed means in the housing cooperating with the rotor member to define a pair of chambers, each of which encompasses a segment of each of said orbits and which are spaced from one another along said orbits,
      said chambers having their orbitally remote ends substantialy at said points, and one of said chambers being an inlet chamber in which said orbits diverge and the other being an outlet chamber in which said orbits converge, each of said chambers being communicated with the exterior of the housing through a port;
(F) sealing means in the housing at the orbitally remote ends of the chambers cooperating with the intermeshed ring member and the rotor member to slidingly seal said ends of said chambers without interfering with orbital motion of said members; and
(G) means in the housing defining a pair of passages, each of which opens to the adjacent ends of said chambers, one of said passages closely embracing the peripheral portion of the rotor member to so cooperate with the teeth thereon that the gullets therebetween provide closed pockets in which fluid can be carried from the inlet chamber to the outlet chamber, and the other of said passages similarly closely embracing and cooperating with the toothed portion of the ring member.

2. A rotary fluid pressure machine operable either as a motor or a pump, comprising:
(A) a housing;
(B) a rotor journalled in the housing for rotation about a fixed axis, said rotor comprising two circular members;
(C) means on each of said rotor members defining a circle of circumferentially spaced teeth which travel in a common orbit as the rotor turns, and which are meshingly interengageable with the teeth on the other rotor member the orbits of the teeth on the two rotor members having substantially the same diameter;
(D) means in the housing constraining the rotor members to rotation about axes which obliquely intersect at the center of the rotor, so that the orbits of their respective teeth lie in planes which are oblique to one another and intersect at a pair of points on a line passing through the center of the rotor,
such intersection of the tooth orbits being accommodated by meshing interengagement of the teeth on the two rotor members at said points whereby a driving relationship between the rotor members is maintained;
(E) means in the housing defining two pairs of chambers arranged around and radially spaced from the center of the rotor,
each pair comprising an inlet chamber and an outlet chamber and each chamber being diametically opposite a counterpart thereof, the pairs of chambers being spaced to opposite sides of said line,
(1) each of said chambers encompassing a segment of both of said orbits of the teeth and having opposite ends spaced from one another along said orbits,
(2) the chambers of each pair having their remote ends adjacent to said line and having their adjacent ends spaced from one another;
(F) means in the housing adjacent to said points operatively engaging the interengaging teeth of the rotor members to seal each pair of chambers from the other; and
(G) means in the housing defining a pair of passages opening to the adjacent ends of the chambers of each pair, said last named passages being defined by walls which snugly embrace the toothed portions of the rotor members to thus, in cooperation with the teeth, form closed pockets by which fluid can be carried from each inlet chamber to its paired outlet chamber.

3. A rotary fluid pressure machine comprising:
(A) a housing defining a rotor chamber;
(B) a shaft journalled in said housing for rotation about a fixed axis;
(C) a disc in the rotor chamber connected to the shaft to turn therewith in a plane normal to the shaft axis;
(D) a ring in the rotor chamber encircling the disc;
(E) interengageable teeth on the outer peripheral portion of the disc and on the inner edge portion of the ring;
(F) guide means in the housing engaging the ring and constraining it to rotation about an axis that obliquely intersects the axis of the shaft at a point substantially on the median plane of the disc,
so that the disc and ring occupy planes which intersect on a line that passes through said point on which the axes intersect and the orbits of their teeth cross one another at diametrically spaced points, at which spaced points the teeth on the disc and ring intermesh;
(G) means in said housing defining two pairs of inlet and outlet chambers arranged around and radially spaced from said fixed axis with each chamber diametrically opposite its counterpart and connectible with an external fluid circuit, said chambers being circumferentially spaced from one another along the orbits of the teeth, with one pair of inlet and outlet chambers at one side of said line and the other pair of chambers at the opposite side of said line,
and each chamber encompassing a segment of both orbits so that the spaces between the teeth open to said chambers as the disc and ring turn;
(H) sealing means in the housing coacting with the intermeshing teeth on the disc and on the ring to seal the pairs of inlet and outlet chambers from one another; and
(I) means in the housing defining two separate passages opening to the adjacent ends of each pair of inlet and outlet chambers and through which the teeth on the disc and on the ring move in travelling from the inlet to the outlet chambers,
said passages having walls which snugly engage the teeth on the disc and on the ring as the teeth move through the passages, so that said passage walls coact with the teeth and form closed pockets in which fluid can be transferred from the inlet to the outlet chambers,
said passages being long enough along the orbits of the teeth to preclude direct communication between the inlet and outlet chambers through the space between two adjacent teeth.

4. The rotary fluid pressure machine of claim 3, wherein the teeth on the disc and on the ring have the same pitch, and
wherein said passages are of the same length and the ends of one passage are axially in line with the ends of the other passage,
so that as soon as a pocket between the teeth on the disc has completed its transfer of fluid to the outlet chamber fed thereby, a pocket between the teeth on the ring begins to transfer fluid to said outlet chamber, and vice versa, so that transfer of fluid from the inlet chambers to the outlet chambers is continuous.

5. The rotary fluid pressure machine of claim 2, wherein certain of the walls of said two separate passages are formed by spherically curved wall surfaces at opposite sides of the disc, and with which the inner edges of the teeth on the ring have close engagement.

6. The rotary fluid pressure machine of claim 3, further characterized by
a pair of annular members encircling the shaft and having the disc confined therebetween,
said annular members having spherically curved peripheral surfaces, the center of curvature of which coincides with the point at which the axes of the disc and ring intersect, and the radius of which is such that the inner edges of the teeth on the ring have close engagement therewith, so that said spherically curved surfaces close the ends of the spaces between said teeth.

7. The rotary fluid pressure machine of claim 3, wherein said guide means comprises annular walls in the housing at opposite sides of the disc and ring, each of said annular walls having angularly disposed semicircular flat surfaces one of which is normal to the shaft axis and the other of which lies in a plane that is oblique to the shaft axis, the semicircular flat surfaces that are normal to the shaft axis being opposed by the semicircular flat surfaces that are oblique to the shaft axis, the semicircular flat surfaces that are normal to the shaft axis having surface-to-surface engagement with the opposite sides of the toothed portion of the disc throughout diametrically opposite angles of 180 degrees, and said semicircular flat surfaces that are oblique to the shaft axis having surface-to-surface engagement with the opposite sides of the ring throughout diametrically opposite angles of 180 degrees.

8. The rotary fluid pressure machine of claim 7, wherein said guide means further comprises a pair of diametrically opposite wedge shaped members fixed in the housing between the toothed portions of the disc and ring where said portions are spaced apart the greatest distance, said wedge shaped members having opposite faces, one of which contacts the adjacent side of the toothed portion of the disc and the other of which contacts the adjacent side of the ring.

9. The rotary fluid pressure machine of claim 8, further characterized by a pair of annular members encircling the shaft and having the disc confined therebetween, said annular members having spherically curved peripheral surfaces, the center of curvature of which coincides with the point at which the axes of the disc and ring intersect, and the radius of which is such that the inner edges of the teeth on the ring have close engagement therewith, so that said spherically curved surfaces close the ends of the spaces between said teeth;

and wherein said wedge shaped members have inner edges in close engagement with the spherically curved peripheral surfaces on said annular members.

10. In a rotary fluid pressure machine of the type comprising a rotor member having its peripheral portion formed as a circle of radially outwardly projecting gear-like teeth that are spaced apart to define fluid transporting pockets between them, and a housing in which the rotor member is journalled for rotation about its axis and which defines an inlet chamber and an outlet chamber through which said teeth successively pass as they move in their orbit, means for progressively increasing the effective volume of said fluid transporting pockets as said teeth move through the inlet chamber and for progressively decreasing the effective volume of said pockets as said teeth move through the outlet chamber, said means comprising:

(A) a ring member having a circle of radially inwardly projecting teeth thereon which closely conform to said pockets in the rotor member and which are spaced apart to define other pockets between them in which said teeth on the rotor member are receivable, so that the ring member is meshingly engageable with the rotor member and is adapted to cooperate with the rotor member in transporting fluid from the inlet chamber to the outlet chamber in consequence of orbital motion of the ring member by which its teeth are carried successively through said chambers; and (B) guide means in the housing constraining the ring member to rotation in a position such that the orbit of its teeth is in a plane obliquely inclined to the plane of the orbit of the teeth on the rotor member and crosses the same at a pair of spaced points at which meshing interengagement of the respective rotor and ring member teeth accommodates such crossing and maintains a driving relationship between the members, said points being adjacent to the orbitally remote ends of said chambers so that the orbits of the rotor member teeth diverge from one of said points in the inlet chamber and converge toward the other of said points in the outlet chamber.

11. A rotary fluid pressure machine operable either as a motor or a pump, comprising:

(A) a housing;

(B) a rotor member journalled in the housing for rotation about a fixed axis;

(C) means on the peripheral portion of the rotor member defining a plurality of circumferentially spaced pockets, the mouths of which open to at least one surface of the rotor member, and which pockets travel in a common circular orbit as the rotor member rotates about said fixed axis;

(D) means in the housing defining a plurality of paired inlet and outlet chambers arranged around and radially spaced from the rotor axis, said chambers being so positioned that each encompasses a segment of the peripheral portion of the rotor member and has communication with the pockets through the mouths thereof, and each chamber having opposite ends spaced from one another along the circular orbit of the pockets;

(E) a plurality of pocket-plugging members, one for each pocket;

(F) means mounting the pocket-plugging members for orbital motion around a center common to that of the rotor member and for movement into and out of their respective pockets;

(G) means in the housing defining passages opening to the ends of the chambers and through which the peripheral portion of the rotor member moves from each chamber to its orbitally adjacent chamber; and (H) means defining the orbit of the pocket-plugging members and constraining them to occupy their respective pockets as the pockets travel from an outlet chamber to an inlet chamber through the passage therebetween, to move out of the pockets as they traverse an inlet chamber and remain out of the pockets as they travel through the passage leading from an inlet chamber to the orbitally adjacent outlet chamber and move back into the pockets as they traverse the outlet chamber, the passage means through which the peripheral portion of the rotor member moves in travelling from an inlet chamber to an outlet chamber being defined by walls which snugly embrace the peripheral portion of the rotor member for a distance along the orbit of the pockets greater than the width of the mouths of the pockets so that said walls close the mouths of the pockets as they are carried through said passage, so that no one pocket can directly communicate the chambers, though fluid can be carried in the pockets from each inlet chamber to its paired outlet chamber, and the other passage means through which the peripheral portion of the rotor moves in travelling from an outlet chamber to the orbitally adjacent inlet chamber being formed by walls which snugly embrace the peripheral portion of the rotor member and cooperate with the pocket plugging members to seal the pairs of chambers from one another.

References Cited

UNITED STATES PATENTS

| | | | |
|---|---|---|---|
| 32,372 | 5/1861 | Jones et al. | 103—127 |
| 351,129 | 10/1886 | Salomo | 103—127 |
| 739,207 | 9/1903 | Nielsen | 103—127 |
| 758,214 | 4/1904 | Nielsen | 91—85 |
| 2,242,058 | 5/1941 | Cuny | 103—127 |
| 2,674,952 | 4/1954 | Jacobsen | 103—127 |
| 3,101,700 | 8/1963 | Bowdish | 230—142 |
| 3,106,912 | 10/1963 | Kahlert | 103—127 |
| 3,176,908 | 4/1965 | Bowdish | 230—142 |
| 3,236,186 | 2/1966 | Wildhaber | 103—117 |

DONLEY J. STOCKING, *Primary Examiner.*

WILBUR J. GOODLIN, *Examiner.*